United States Patent [19]

Yamada et al.

[11] Patent Number: 6,119,004
[45] Date of Patent: Sep. 12, 2000

[54] BASE STATION EQUIPMENT FOR MOBILE COMMUNICATION

[75] Inventors: Daisuke Yamada, Inagi; Izumi Horikawa, Yokohama, both of Japan

[73] Assignee: Matsushita Electric Industrial Co., Ltd., Osaka, Japan

[21] Appl. No.: 09/068,541

[22] PCT Filed: Sep. 25, 1997

[86] PCT No.: PCT/JP97/03405

§ 371 Date: May 13, 1998

§ 102(e) Date: May 13, 1998

[87] PCT Pub. No.: WO98/13956

PCT Pub. Date: Apr. 2, 1998

[30] Foreign Application Priority Data

Sep. 25, 1996 [JP] Japan .................................. 8-272904
Oct. 18, 1996 [JP] Japan .................................. 8-295925

[51] Int. Cl.<sup>7</sup> ....................................................... H04Q 7/20
[52] U.S. Cl. .......................... 455/436; 455/561; 455/442; 370/331
[58] Field of Search ..................................... 455/436, 442, 455/438, 439, 440, 561, 422, 550; 370/331, 334, 332; 435/562

[56] References Cited

U.S. PATENT DOCUMENTS

| 5,590,404 | 12/1996 | Sato et al. ................................ 455/561 |
| 5,625,876 | 4/1997 | Gilhousen et al. ...................... 370/331 |
| 5,903,841 | 5/1999 | Kondo ..................................... 455/436 |
| 5,933,787 | 8/1999 | Gilhousen et al. ...................... 455/562 |
| 5,940,774 | 8/1999 | Schmidt et al. ......................... 455/561 |

FOREIGN PATENT DOCUMENTS

| 0480896 | 4/1992 | European Pat. Off. . |
| 2133833 | 6/1987 | Japan . |
| 3117121 | 5/1991 | Japan . |
| 3268697 | 11/1991 | Japan . |
| 4167720 | 6/1992 | Japan . |
| 4507177 | 12/1992 | Japan . |
| 6-14008 | 1/1994 | Japan . |
| 6-97871 | 4/1994 | Japan . |
| 7-46644 | 2/1995 | Japan . |
| 7-46646 | 2/1995 | Japan . |
| 7131845 | 5/1995 | Japan . |
| 8-51662 | 2/1996 | Japan . |
| 8-65201 | 3/1996 | Japan . |
| 1/07043 | 5/1991 | WIPO . |

OTHER PUBLICATIONS

An International Search Report issued with PCT App. No. PCT/JP97/03405.
A Japanese Language abstract of JP No. 7–46646.
A Japanese Language abstract of JP No. 7–46644.
A Japanese Language abstract of JP No. 62–133833.
A Japanese Language abstract of JP No. 8–65201.
A Japanese Language abstract of JP No. 4–167720.
A Japanese Language abstract of JP No. 6–14008.
A Japanese Language abstract of JP No. 3–268697.
A Japanese Language abstract of JP No. 3–117121.
A Japanese Language abstract of JP No. 8–51662.

*Primary Examiner*—Dwayne D. Bost
*Assistant Examiner*—Tracy M. Legree
*Attorney, Agent, or Firm*—Greenblum & Bernstein, P.L.C.

[57] ABSTRACT

In a base station apparatus in a mobile communication comprising a transmitting/receiving section for each sector, a baseband processing section for each sector and a sector switch to select a connection with the transmitting/receiving section and the baseband processing section, when a handover is made, a soft handover is executed by selecting a plurality of sectors on the basis of information concerning peripheral sectors obtained from a mobile station and connecting the transmitting/receiving sections of the selected sectors and the baseband processing section with the sector switch.

12 Claims, 7 Drawing Sheets

BASE STATION EQUIPMENT FOR MOBILE COMMUNICATION

TECHNICAL FIELD

The present invention relates to a base station apparatus in a mobile communication in which transmission and reception are executed by sector, preferably to a base station apparatus in a mobile communication to reduce the scale of the hardware of a base station and improve the communication quality.

BACKGROUND ART

As a mobile communication technique in a cellar system, a sector transmission and reception method, in which a base station has a plurality of base station antennas composed of directive antennas and each of a plurality of cells comprises a plurality of sectors where a different frequency is used for each sector to communicate, has been developed.

The sector transmission and reception method allows to use the same frequency repeatedly in nearer cells, which makes the efficiency of frequency reuse higher and increases the number of users accommodated.

In the sector transmission and reception method described above, when a mobile station in communication moves from a cell to another cell, a handover between cells by a switching equipment is executed. And when a mobile station cross a boundary between sectors, a handover between sectors by controlling of a base station is executed.

For instance, In Japanese Unexamined Patent publication No.7-131845, a base station apparatus for executing sector-transmitting-receiving is described. The base station apparatus is to execute data communication on the basis of CDMA (Code Division Multiple Access) mobile communication system. Illustrated in FIG. 6, the base station apparatus described above comprises M numbers (M is an integer number indicating the number of cells) of sector antenna 303, M numbers of batch modulating/demodulating section 302-1 through 302-M to modulate and demodulate transmission and reception signals by a plurality of communication channels in the batch in a frequency determined for each sector and N numbers (N is an integer number indicating the numbers of communication channels) of baseband signal processing section 301-1 though 301-N to process baseband signals of each communication channel. In addition, in FIG. 6, CLK illustrates a clock signal to operate each circuit.

Figure 7:
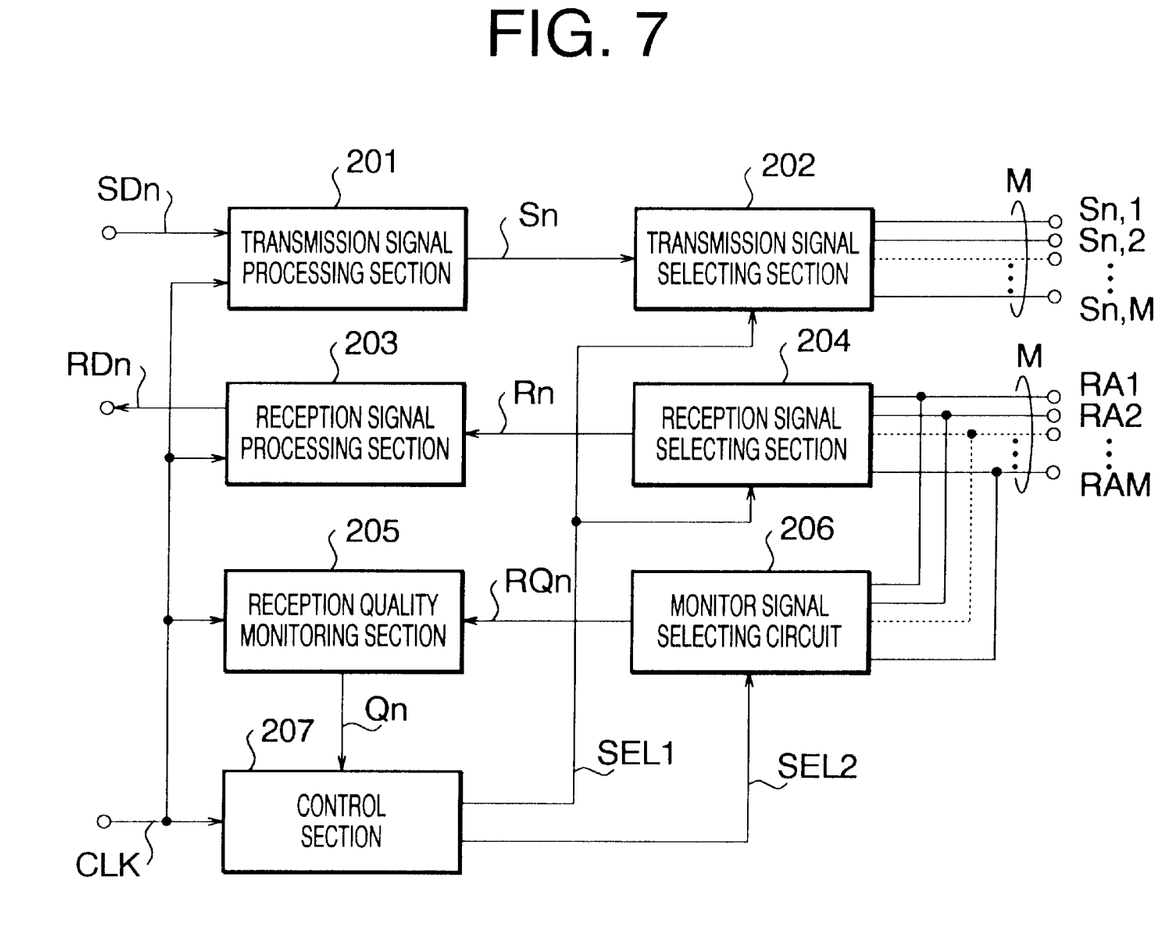
FIG. 7 is a block diagram illustrating a baseband processing section at a conventional base station apparatus in a mobile communication.

As illustrated in FIG. 7, each of baseband signal processing section 301-1 through 301-N comprises transmission signal processing section 201 to generate transmission signal Sn corresponding to a modulation method from transmission data SDn, transmission signal selecting circuit 202 to output this transmission data Sn to the instructed sector, reception signal selecting circuit 204 to select signal RAm(m=1~M) received by each sector according to an instruction, reception signal selecting processing section 203 to detect reception data RDn corresponding to the communication channel from selected reception signal Rn, monitor signal selecting circuit 206 to select signal Am received at each sector according to an instruction to output, reception quality monitoring section 205 to monitor the reception quality of the reception signal selected by monitor signal selecting circuit 206, and control section 207 to instruct monitor signal selecting circuit 206 to switch a sector to be selected at a certain time intervals, and to instruct transmission signal selecting circuit 202 and reception signal selecting circuit 204 to select a sector having the most appreciate reception quality on the basis of the detection result by reception quality monitoring section 205.

In the base station transmitting and receiving apparatus, transmission data SDn (n=1~N) of the number n channel is input to transmission signal processing section 201 at the number n of baseband signal processing section 301-n. Transmission signal processing section 201 generates transmission signal Sn corresponding to a modulation method from this transmission data SDn. This transmission signal Sn is input into transmission signal selecting circuit 202. Transmission signal selecting circuit 202 outputs this transmission signal Sn [Sn,m=Sn(m=SEL1), Sn,m=0(m≠SEL1)] to a sector instructed by selecting signal SEL1 from control section 207. In addition, Sn is a waveform indicated in digital signals.

Figure 6:
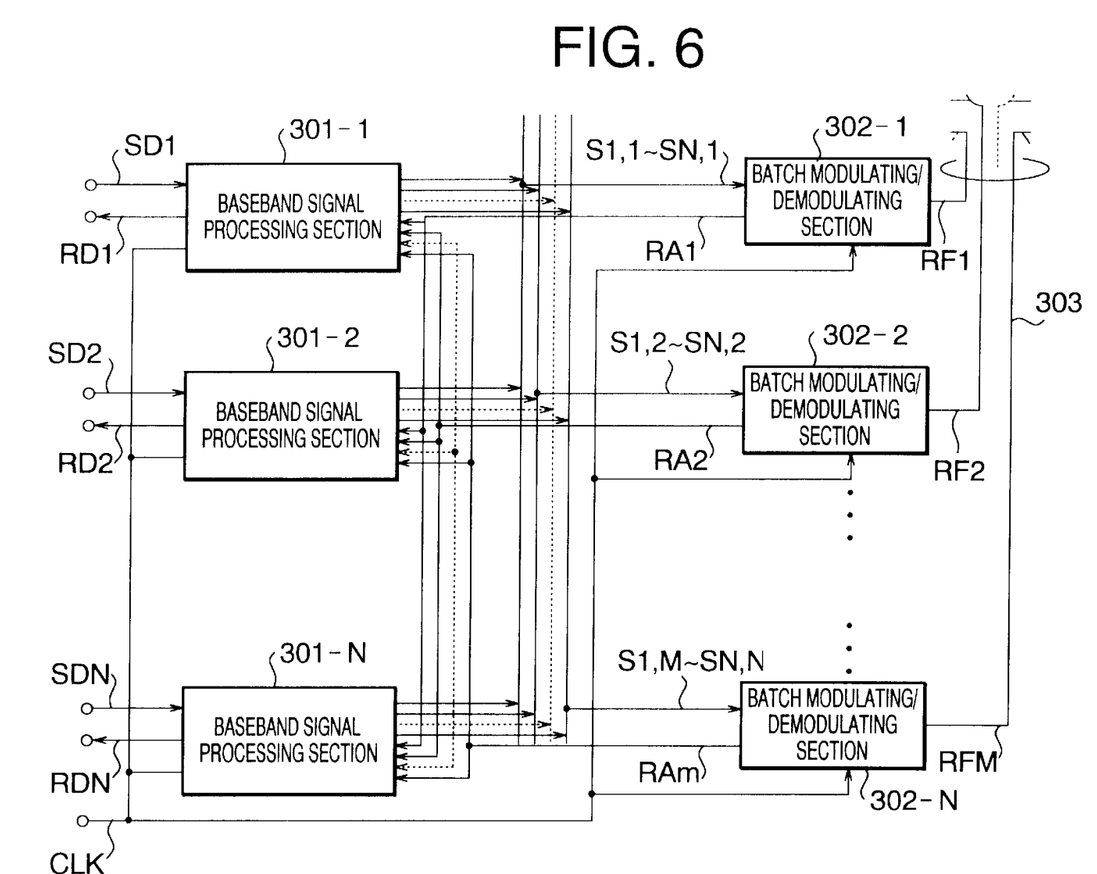
FIG. 6 is a block diagram illustrating a conventional base station apparatus in a mobile communication.

Transmission signal Sn,m output from transmission signal selecting section 202 of signal processing section 301-$n$ is input to batch modulating/demodulating section 302-1 through 302-M. Batch modulating/demodulating section 302-m add transmission signal from S1,m to SN,m provided respectively from baseband signal processing section from 301-1 to 301-N, converts them into analog signals, then converts into transmission radio signals. This transmission radio signals are transmitted from antenna 303 at a sector. Signal RFm (m=1~M) indicates transmission and reception radio signals of the number m sector.

On the other hand, signals received by antenna 303 of each sector is input into batch modulating/demodulating section 302-1 through 302-M. Batch modulating/demodulating section 302-$m$ converts reception radio signals in a band corresponding to N numbers of communication channels into baseband signals collectively then converts them into digital signals to output. This baseband signal RAm is provided to all of baseband signal processing section 301-1 through 301-N.

Reception signal selecting circuit 204 at baseband signal processing section 301-$n$ selects reception signal Rn [Rn=RAm(m=SEL1)] of the sector instructed by selecting signal SEL1 at control section 207 from M numbers of reception signals RA1 through RAM to output into reception signal processing section 203. Reception signal processing section 203 detects reception data RDn corresponding to the communication channel from the selected reception signal Rn.

And, control section 207 switches selecting signal SEL2 for monitor signal selecting circuit 206 at intervals of predetermined duration time. Monitor signal selecting circuit 206 receives it, selects reception signal RQn [RQn=RAm (m=SEL2)] of the sector instructed by selecting signal SEL2 from M numbers of reception signals from RA1 to RAM to output into reception quality monitoring section 205. Reception quality monitoring section 205 monitors the reception quality of the selected reception signal RQn (for instance, reception power, interference wave power, examination error power, error ratio and others) to transmit to control section 207 with reception quality signal Qn. As described above, control section 207 monitors the reception quality of each sector by using reception quality monitoring section 205 and outputs selecting signal SELL to select the sector having the best reception quality into transmission signal selecting circuit 202 and reception signal selecting circuit 204.

Accordingly, when a mobile station moves crossing a sector, the most appropriate sector is selected automatically within baseband signal processing section 301-1 through 301-N.

As described above, in a conventional base station apparatus in a mobile communication, when a mobile station moves crossing a sector, a handover controlled by the base station, where the base station decides the most appropriate sector on the basis of reception signals received from a mobile station, is executed.

And, since a handover in a conventional base station apparatus is controlled by the base station where a basebnad processing section selects the sector having the best reception quality on the basis of reception quality signals from each sector, there has been a problem that a scale of hardware becomes larger because a comparing circuit is necessary to detect the reception quality from each sector and select a sector on the basis of the detected qualities.

And, since a handover is executed by a hard handover in which a connection with a cannel is once terminated to switch a channel for a new connection with another channel, there has been a problem that generated short break brings deterioration in reception quality.

And, since a transmission from a base station is executed through one line, there has been a problem that a soft handover, in which reception signals from a plurality of sectors are composed for handover, can not be executed.

DISCLOSURE OF INVENTION

The present invention aims to solve the problems described above and has an object to provide a base station apparatus in a mobile communication capable of excellent quality communication with the expansion of hardware scale in a base station reduced and the flexibility and reliability of the system improved (in which the expansion of hardware scale in a base station is reduced, the flexibility and reliability of the system are improved, which makes excellent quality communication possible).

Hence, in the present invention, in a base station apparatus in a mobile communication comprising a plurality of transmission/receiving sections each for each sector, a plurality of baseband processing sections each for each sector and a sector switch to select a connection between a transmission/receiving section and a baseband processing section, when a handover is made, a soft handover between sectors is executed by selecting a plurality of sectors on the basis of information of peripheral sectors obtained from a mobile station and connecting transmission/receiving sections and baseband processing sections of the selected sectors with a sector switch.

According to the present invention, a soft handover between sectors is executed on the basis of information brought from a mobile station, which prevents an instantaneously termination and decreases of reception level in a handover and makes (that results in) high quality communication possible with the expansion of hardware of a base station controlled.

And, since a baseband processing section is not fixed for a sector, when traffic of one sector increases, it modulating/demodulating processings can be assigned for some baseband processing sections. And flexible actions are available against a failure of baseband processing section and others.

And, since the control of a soft handover between sectors is executed only within a base station apparatus, it is enough to transmit information needed for a soft handover between only cells into a switching equipment, which reduces the communication amount between a base station and a switching equipment and improves the communication efficiency.

And, in the present invention, in a base station apparatus in a mobile station system in which a service area is divided into a plurality of cells each composed of a plurality of sectors, the base station in the mobile communication has a plurality of transmitting/receiving sections to convert radio signals received by each sector into reception baseband signals while converting transmission baseband signals of each sector into transmission radio signals, a plurality of baseband processing sections to demodulate reception signals from the reception baseband signal while converting transmission signals into the transmission baseband signal, a sector switch to switch a connection between the transmitting/receiving sections and the baseband processing sections, selection control section to select a new sector to which a handover is made on the basis of information concerning peripheral sectors transmitted from a mobile station and connection control section to control the sector switch to connect the transmitting/receiving section of the new sector for a handover with the appropriate baseband processing section.

According to the constitution, when a handover is executed, a soft handover, in which reception signals at a plurality of sectors are maximum ratio combined and transmission signals are transmitted via. a plurality of sectors, is achieved without expanding the hardware scale of a base station.

And, in the present invention, there is a circuit, in which, when a soft handover between sectors is executed, a sector switch connects each of transmitting/receiving sections of a plurality of sectors with a baseband processing section separately, demodulated signals are composed at each baseband processing section and information signals for transmitting are distributed to each baseband processing section, which allows to select a baseband processing section to connect when a soft handover between sectors is executed, taking into account the traffic of sectors.

And, in the present invention, when a soft handover between sectors is executed, a sector switch connects transmitting/receiving sections of a plurality of sectors with the same baseband processing section and the baseband processing section diversity composes reception signals at each sector, which permits the maximum combination for a soft handover by one baseband.

And, in the present invention, a baseband processing section composes reception signals obtained by side diversity between sectors, space diversity for selecting an antenna and path diversity for selecting delayed waves to demodulate information signals, which allows to achieve high communication performance.

And, in the present invention, a baseband processing section converts reception signals obtained by side diversity between sectors, space diversity for selecting an antenna and path diversity for selecting delayed waves into signals capable of batch processing to process by composing.

According to the constitution, since the results obtained by each of path diversity for selecting delayed waves, space diversity for selecting an antenna and side diversity between sectors, are output as a correlation output of the same state, which allows to process this output by small numbers of despreading circuits and RAKE composite circuits.

And, in the invention, a synchronizing circuit to acquire synchronization from reception baseband signals is prepared independently from a baseband processing section, and the synchronizing circuit controls the timing of processing at a plurality of baseband processing sections. Because of it, in the case of transmitting a large scale of data using a plurality of codes (multicode transmission), one synchronizing circuit can collectively control the timings of a plurality of baseband processing sections and smooth and flexible demodulation is achieved.

And, in the present invention, a spreading circuit to spread process transmission signals using a spreading code is prepared at a transmitting/receiving section.

According to the constitution, since a signal rate passing through a transmission sector switch becomes lower, a low rate switch can be used. In addition, since a spreading circuit is prepared for a sector as a unit, the circuit is simplified rather than the case of preparing a spreading circuit at a baseband section.

BEST MODE FOR CARRYING OUT THE INVENTION

The embodiment of the present invention is concretely described with reference to drawings in the following.
(First embodiment)

Figure 1:
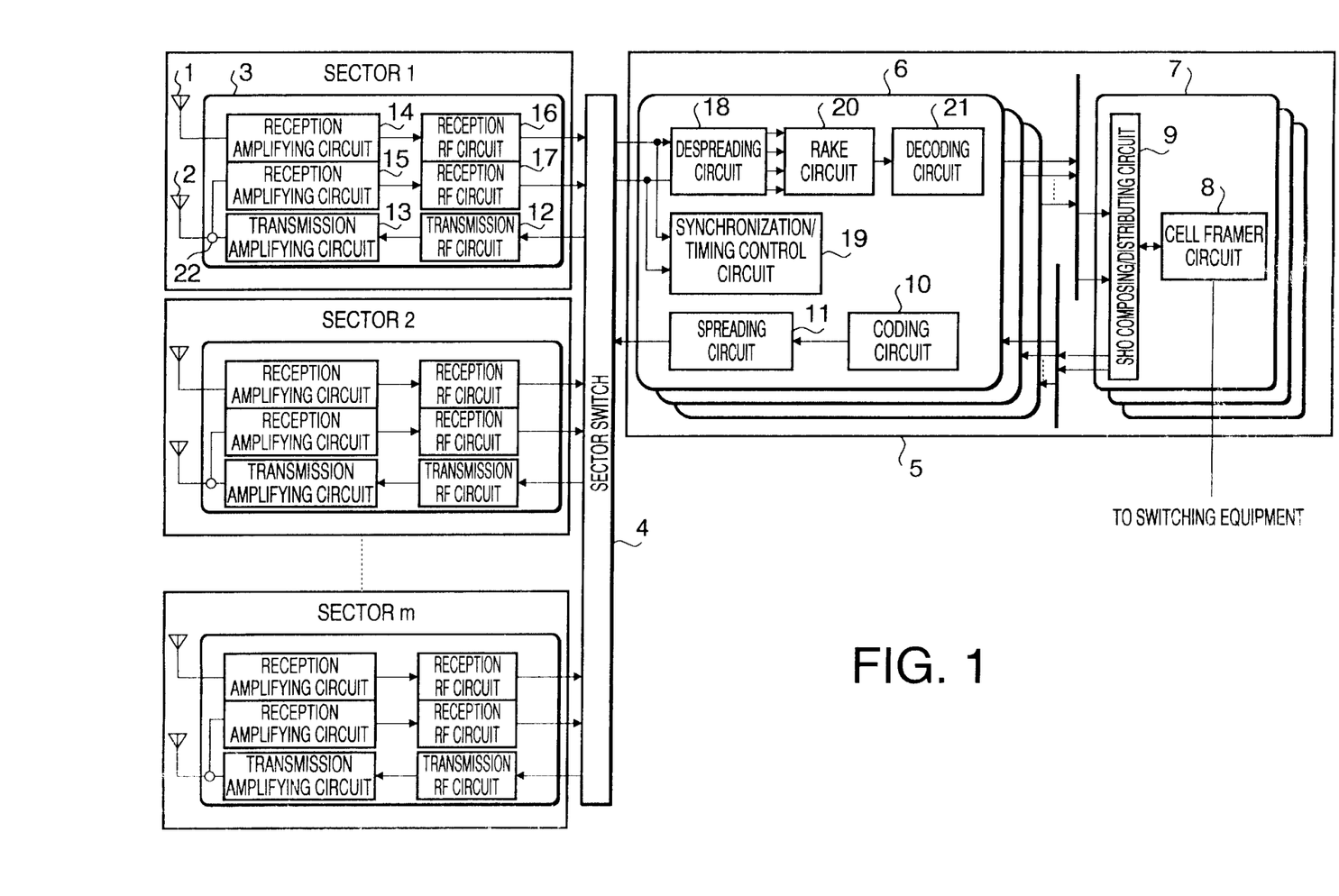
FIG. 1 is a block diagram illustrating a base station apparatus in the first embodiment of the present invention.

FIG. 1 illustrates a base station apparatus in the first embodiment of the present invention that is a base station in a mobile communication in a CDMA system. The base station apparatus in the first embodiment of the present invention comprises base station transmitting/receiving unit 3 to process orthogonal modulation/demodulation and frequency conversion of transmission signals and reception signals for each sector, base station modulating/demodulating unit 5 to spread and despread with a spreading code, and to compose and separate corresponding to transmission signals and reception signals of each channel, sector switch 4 to select a connection between base station modulating/demodulating unit 5 and base station transmitting/receiving unit 3 and control section (not shown) to control operations of each unit at the base station apparatus.

The number of existing base station transmitting/receiving unit 3 is the same as that of sectors. The number of sectors are determined by service contents, the number of users and others. Base station transmitting/receiving unit 3 comprises a plurality of antennas 1 and 2 (in this case, the number of antennas is two, however the number of antennas is determined by the apparatus scale and others), transmission RF circuit 12 to process orthogonal modulation and frequency conversion of transmission signals, transmission amplifying circuit 13 to amplify transmission radio signals, common circuit 22 to use antenna 2 in common of transmission and reception, reception amplifying circuit 14 and 15 to amplify signals received by antenna 1 and 2, and reception RF circuit 16 and 17 to process orthogonal modulation and frequency conversion of reception signals.

And, base station modulating/demodulating unit 5 comprises N numbers of baseband processing (BB) section 6 to spread and despread with a spreading code of each channel and a plurality of soft handover interface (SHO-IF) section 7 to compose and separate signals of each channel.

BB section 6 comprises coding circuit 10 to code transmission signals, spreading circuit 11 to spread the transmission signals using a spreading code of a channel assigned for transmission signals, despreading circuit 18 to detect correlation of reception signals using a spreading code of a channel assigned for reception signals, synchronization/timing control circuit 19 to control the timing of base station apparatus by detecting a synchronization from reception signals, RAKE circuit 20 to compose each multi-pass propagated reception signals and decoding circuit 21 to decode reception signals.

And SHO-IF section 7 comprises cell framer circuit 8 to frame and deframe ATM cells in which information is communicated with switching equipment in mobile system and SHO composing/distributing circuit 9 to execute a soft handover when a handover between sectors is made.

This base station apparatus operates in an ordinary time as follows. The ordinary time means when a soft handover is not executed.

When a communication starts or a handover between cells is executed, a base station control section assigns the combination of BB section 6 and SHO-IF section 7 to base station transmitting/receiving unit 3.

Transmission data for a certain mobile station is transmitted in ATM cells from the switching equipment and provided into cell framer circuit 8 at base station modulating/demodulating unit 5, where ATM cells are deframed to extract information signals. The information signals are passed though SHO composing/distributing circuit 9, coded at coding circuit 10 at BB circuit 6 then framed. Information signals in frames are spreading processed at spreading circuit 11 using a spreading code of a mobile station to output into sector switch 4.

Sector switch 4 selects a sector to transmit by a control signal of the base station control section then outputs transmission signals into transmission RF circuit 12 at base station transmitting/receiving unit 3 of the selected sector.

Spread signals for each user are multiplied at transmission RF circuit 12, processed D/A conversion, orthogonal modulation and frequency conversion, amplified transmission amplifying circuit 13 then transmitted for radio propagation paths from antenna 2.

On the other hand, multiplied signals transmitted via radio multi propagation paths are received by antenna 1 and 2, and amplified at amplifying circuit 14 and 15 respectively for antenna 1 and antenna 2. Reception RF signal circuit 16 and 17 execute frequency conversion, auto gain control processing, demodulation processing and A/D conversion (sampling rate=k/T, 1/T=chip rate, k: positive integer number) of reception signals respectively received by antenna 1 and 2 to output into sector switch 4.

Sector switch 4 selects BB section 6 (the number n of BB section) same as when transmitted by a control signal of base station control section to output reception signals.

Despreading circuit 18 at the number n of BB section detects correlation of each reception signals of antenna 1 and 2 using a spreading code of a mobile station. And synchronization/timing circuit 19 selects the timings of some samples of delayed waves having high reception level from each reception signals received by antenna 1 and 2. RAKE circuit 20 demodulates each of selected delayed waves separately to Rake compose. Decoding circuit 21 decodes using the composed data to obtain information signals.

Decoded information signals are passed through SHO composing/distributing circuit 9, framed in ATM cells at cell framer circuit 8 then transmitted into the switching equipment.

Next, operations in a soft handover are explained.

The number of sectors for a soft handover are determined by required quality and apparatus scale. In this case, it is explained that a soft handover is executed between two sectors.

A base station control section decides a new sector of the number m for a handover on the basis of information concerning peripheral sectors and cells transmitted from a mobile station (reception power, interference power, error rate, etc.) and decides BB section 6 (the number j of BB section) to connect the sector, taking into account the traffic.

Sector switch 4 provides output signals of reception RF circuit 16 and 17 of the sector in an initial communication (referred as the first sector) by a control signal from a base station control section and provides output signals of reception RF circuit 16 and 17 of the number m of sector decided to hand over into the number j of BB section 6 which executes a soft handover.

Despreading circuit 18 of each BB section 6 detects correlation of each reception signals of antenna 1 and 2 using a spreading code of a mobile station. And synchronization/timing control circuit 19 selects the timings of some samples of delayed waves having high reception level from reception signals received by antenna 1 and 2. RAKE composing circuit 20 demodulates each of selected delayed waves separately to Rake compose. Decoding circuit 21 decodes using the composed data to obtain information signals.

Information signals decoded at the number n and number j of BB sections 6 are input into SHO composing/distributing circuit 9 of SHO-IF section 7 initially selected. A base station control section instructs this SHO-IF section 7 the maximum ratio combine the signal decoded for each sector on the basis of reliability information (reception power, interference power, error rate, etc.) transmitted from a mobile station. The composed signals are framed into ATM cells at cell framer circuit 8 to transmit into the switching equipment.

On the other hand, transmission data for a mobile station is transmitted in ATM cells from the switching equipment and cell framer circuit 8 deframes the cells to extract information signals. SHO distributing/composing circuit 9 distributes the information signals to the number n and j of BB section 6 to output.

Coding circuit 10 of each BB circuit 6 codes the information signals and frames them to output into spreading circuit 11. Spreading circuit 11 spreading processes the signals using a spreading code of a mobile station and outputs the processed signals into sector switch 4.

Sector switch 4 distributes the spreading signals to first sector and the number m of sectors.

Transmission RF circuit 12 of base station transmitting/receiving unit 3 at each sector multiplies the spread signals then processes orthogonal modulation and frequency conversion. The converted signals are amplified at transmission amplifying circuit 13 then transmitted for radio propagation paths from antenna 2.

According to the first embodiment, since an new sector for a handover is decided on the basis of information concerning peripheral sectors and cells transmitted from a mobile station into a base station apparatus (reception level, interference power, error rate, etc.), it is not necessary for a base station to compare reception level of a mobile station at each sector, which simplifies circuits.

And, BB section 6 is not fixed for a sector but assigns for a sector decided corresponding to traffics. According to the flexible constitution, it is possible to further reduce the hardware scale of a base station apparatus.

And in this base station, because a soft handover is executed, a short break does not caouse in a soft handover between sectors. At this time, since a plurality of sectors transmit transmission signals, a soft handover is possible in a mobile station, which improves communication quality.

And, all controls of a handover between sectors are executed at a base station and it is enough to transmit necessary information to to a switching equipment only when a soft handover between cells is executed, is transmitted from a base station.

(The second embodiment)

Figure 2:
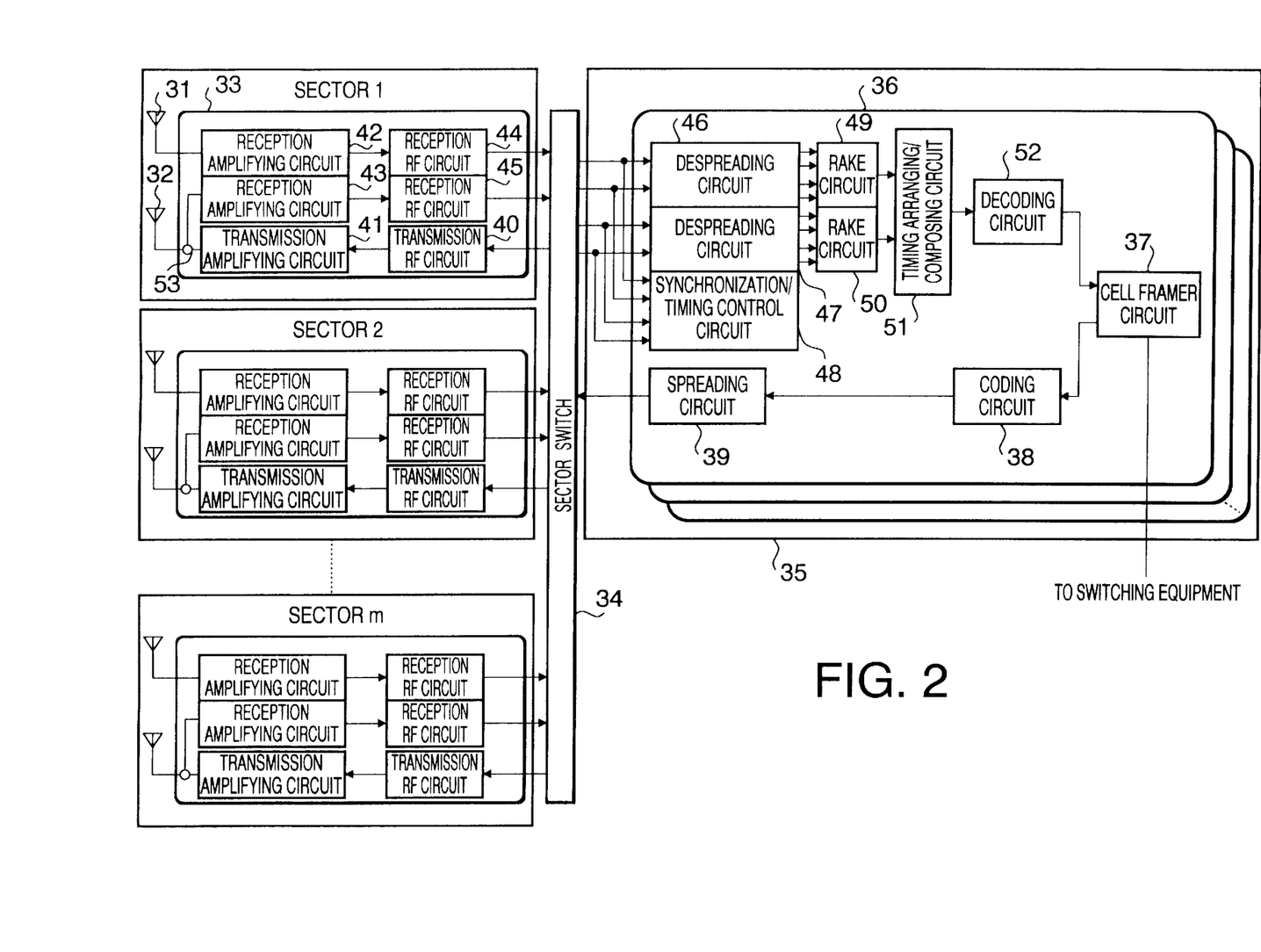
FIG. 2 is a block diagram illustrating a base station apparatus in the second embodiment of the present invention.

A base station apparatus in the second embodiment executes processing for a soft handover using one baseband section.

FIG. 2 illustrates a block diagram of a base station in the second embodiment. In the base station apparatus, each of N numbers of BB section 36 of base station modulating/demodulating unit 35 comprises cell framer circuit 37 to frame and deframe ATM cells in which information is communicated with a switching equipment, coding circuit 38 to code transmission signals, spreading circuit 39 to spreading process transmission signals using a spreading code of a mobile station, a plurality of despreading circuit 46 and 47 to detect correlation of reception signals using a spreading code of a mobile station, synchronization/timing circuit 48 to control the timing of base station apparatus by detecting a synchronization from reception signals, a plurality of RAKE circuit 49 and 50 to compose each of multi-pass propagated reception signals, timing arranging/composing circuit 51 to maximum ratio combine outputs from each of RAKE circuit 49 and 50 and decoding circuit 52 to decode reception signals on the basis of outputs from timing arranging/composing circuit 51.

The configurations of base station transmitting/receiving circuit 33 and sector switch 34 are the same as those of the first embodiment (FIG. 1) with base station control section comprised (not illustrated).

This base station apparatus operates in an ordinary time (when a soft handover is not executed) as follows.

When a communication starts or a soft handover is executed, a base station control section decides the combination of BB section 36 and base station transmitting/receiving unit 33.

Transmission data for a certain mobile station is transmitted in ATM cells from the switching equipment and provided into cell framer circuit 37 at BB section 36, where ATM signals are deframed to extract information signals. The information signals are coded at coding circuit 38, framed, spreading processed at spreading circuit 39 using a spreading code of a mobile station then output into sector switch 34.

Sector switch 34 selects a sector to transmit by an instruction of the base station control section then outputs transmission signals into transmission RF circuit 40 at base station transmitting/receiving unit 45 of the selected sector.

Despread signals for each user are multiplied at transmission RF circuit 40, processed D/A conversion, orthogonal modulation and frequency conversion, amplified at transmission amplifying circuit 13 then transmitted for radio propagation paths from antenna 32.

On the other hand, multiplied signals transmitted via radio multi propagation paths are received by antenna 31 and 32, and amplified at amplifying circuit 42 and 45 respectively for antenna 31 and 32. Reception RF signal circuit 44 and 45 execute frequency conversion, auto gain control processing, demodulation processing and A/D conversion of each reception signals received by antenna 31 and 32 to output into sector switch 34.

Sector switch 34 selects BB section 6 (the number n of BB section) same as when transmitted to output reception signals.

Despreading circuit 46 and 47 at BB section 36 detect correlation of each reception signals of antenna 31 and 32 using a spreading code. And, synchronization/timing control circuit 48 selects the timings of some samples of delayed waves having high reception level from each reception signals received by antenna 31 and 32. RAKE circuit 49 and 50 demodulate each of delayed waves selected from each reception signals received by antenna 31 and 32 separately to RAKE compose.

Timing arranging/composing circuit 51 is excute the maximum ratio combine each output of RAKE circuit 48 and 50. The composed signals are output into decoding circuit 52. Decoding circuit 52 decodes using the composed data to obtain information signals.

Decoded information signals are framed in ATM cells at cell framer circuit 37 then transmitted into the switching equipment.

Next, operations in a soft handover are explained. In this case, it is explained that a soft handover is executed between two sectors.

A base station control section decides a sector to hand over (referred as a new sector )on the basis of information concerning peripheral sectors and cells transmitted from a mobile station (reception power, interference power, error rate, etc). Based on the decision, sector switch 34 provides output signals of reception RF circuit 44 and 45 of the sector in the initial communication (referred as an old sector) and output signals of reception RF circuit of the new sector into the same BB section 6 of the number n.

Since synchronization/timing control circuit 48 at BB section 36 already acquired the synchronization with the signals from the old sector, it tries to acquire a synchronization with signals from the new sector. When the synchronization is acquired, despreading circuit 46 detects correlation of reception signals from the old sector using a spreading code, and despreading circuit 47 detects correlation of reception signals from the new sector using a spreading code.

RAKE circuit 49 demodulates each of delayed waves of a timing selected at synchronization/timing circuit 48 from outputs at despreading circuit 46 separately to RAKE compose. And, RAKE circuit 50 demodulates each of delayed waves of a timing selected at synchronization/timing circuit 48 from outputs at despreading circuit 47 separately to RAKE compose.

Timing arranging/composing circuit 51 is execute the maximum ratio combine outputs of each RAKE circuit 49 and 50, and arranging shifts of timing between sectors.

Decoding circuit 52 decodes using the composed signals to obtain information signals. Decoded information signals are framed into ATM cells at cell framer circuit 37 then transmitted into the switching equipment.

On the other hand, transmission data for the mobile station is transmitted from the switching equipment in ATM cells. And only information signals are extracted at cell framer circuit 37, coded at coding circuit 38, spreading processed at spreading circuit 39 using a spreading code to assigned the mobile station then the processed signals are output into sector switch 34.

Sector switch 34 assigns the same spread signals for the old sector and the new sector.

Transmission RF circuit 40 of base station transmitting/receiving unit 33 at each sector multiplies spread signals and processes orthogonal conversion and frequency conversion of the signals. Converted signals are amplified at transmission amplifying circuit 41 then transmitted for radio propagation paths from antenna 32.

And, in a soft handover between cells, information signals decoded at decoding circuit 52 and reliability information (reception level, etc.) are framed into ATM cells and transmitted into the switching equipment. The switching equipment composes or selects information signals received from an old sector and an new sector using this reliability information to obtain desired information signals.

According to the second embodiment, in a soft handover between sectors, since reception signals from an old sector and a new sector are executed the maximum ratio combine by diversity using the same baseband section, the effectiveness to improve communication quality can be acquired.

And, a soft handover bewteen sectors is controlled within a base station and it is enough to transmit necessary information to a switching equipment only when a soft handover between cells is executed. That reduces the communication amount between a base station and a switching equipment, which improves the communication efficiency.

(Third embodiment)

Figure 3:
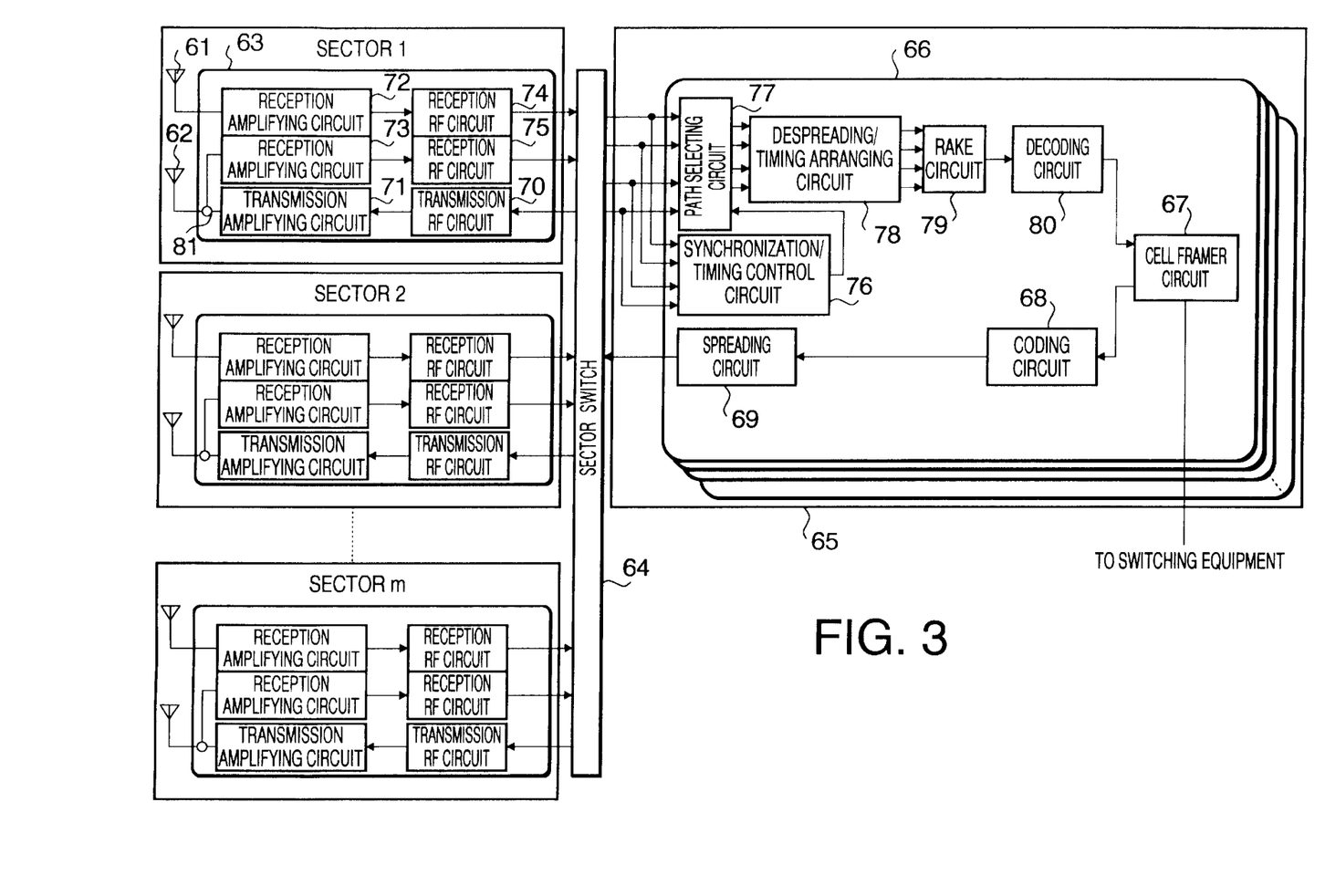
FIG. 3 is a block diagram illustrating a base station apparatus in the third embodiment of the present invention.

The circuit scale of a base station in the third embodiment can be reduced compared to that in the second embodiment.

FIG. 3 illustrates a block diagram of a base station in the third embodiment. In the base station apparatus, each of N numbers of BB section 66 of base station modulating/demodulating unit 65 comprises cell framer circuit 67 to frame and deframe ATM cells in which information is communicated with a switching equipment, coding circuit 68 to code transmission signals, spreading circuit 69 to spreading process transmission signals using a spreading code of a mobile station, synchronization/timing control circuit 76 to control the timing of base station apparatus by detecting a synchronization from reception signals, path selecting circuit 77 to select a delayed wave of high reception level, despreading/timing arranging circuits 78 to detect correlation of reception signals of the selected path using a spreading code of a mobile station, RAKE circuits 79 to compose reception signals of each selected path, and decoding circuit 80 to decode reception signals on the basis of outputs from RAKE circuits 79.

The configurations of base station transmitting/receiving circuit 63 and sector switch 64 are the same as those of the first embodiment with a base station control section comprised, however it is not illustrated.

In the base station apparatus, transmission in an ordinary time (without soft handover) is executed in the same way as the second embodiment.

On the other hand, multiplied signals transmitted via radio multi propagation paths are received by antenna 61 and 62, and respectively amplified at reception amplifying circuit 72 and 73. Reception RF signal circuit 74 and 75 executes frequency conversion, AGC processing, demodulation processing and A/D conversion of each reception signals received by antenna 61 and 62 to output into sector switch 64.

Sector switch 64 selects BB section 66 same as when transmitted to output reception signals.

Synchronization/timing control circuit 76 at BB section 66 selects the timings of some samples of delayed waves having high reception level from reception signals received by each antenna 61 and 62 then outputs a path selection signal into path selecting circuit 77. Path selecting circuit 77 selects output signals from sector switch 64 by the path selection signal and outputs some samples of delayed waves having high reception level into despreading/timing arranging circuit 78. Despreading/timing arranging circuit 78 detects correlation of the output signals using a spreading code. RAKE circuit 79 demodulates each of selected delayed waves separately to Rake compose.

The output signals from RAKE circuit 79 are provided into decoding circuit 80 and decoding circuit 80 decodes the signals to obtain information signals.

Decoded information signals are framed in ATM cells at cell framer circuit 8 then transmitted into the switching equipment.

When a soft handover is executed, in the same way as the second embodiment, sector switch 64 provides outputs from reception RF circuit 74 and 75 of a sector in an initial communication (old sector) and reception RF circuit of a new sector into the same BB section 66 of number 66.

Since synchronization/timing control circuit 76 at BB section 66 already acquired the synchronization with the signals from the old sector, it tries to acquire the synchronization with the signals from the new sector. When the synchronization is established, synchronization/timing control circuit 76 selects some samples of delayed waves having high reception then outputs a path selection signal into path selecting circuit 77. Path selecting circuit 77 selects output signals from sector switch 64 by the path selection signal and outputs some samples of delayed waves having high reception level into despreading/timing arranging circuit 78. Despreading/timing arranging circuit 78 detects correlation of the output signals with a spreading code arranging the timing of shifts between sectors. RAKE composing circuit 79 demodulates each of selected delayed waves separately to Rake compose. The output signals from RAKE composing circuit 79 are provided into decoding circuit 80 and decoding circuit 80 decodes the signals to obtain information signals. Decoded information signals are framed in ATM cells at cell framer circuit 8 then transmitted into a switching equipment.

The processing of transmission signals in a soft handover is executed in the same way as the second embodiment.

And, when a soft handover between cells is executed, information signals decoded at decoding circuit 80 and reliability information (reception level, etc.) are framed into ATM cells and transmitted into the switching equipment. The switching equipment composes or selects information signals received from an old sector and a new sector using the reliability information to obtain desired information.

As described above, when a soft handover between cells is executed, the base station apparatus executes the maximum ratio combine for reception signals from the old sector and the new sector using the same baseband section. At this time, path diversity to select a delayed wave, space diversity to select an antenna and site diversity between sectors are executed by processing correlation outputs from despreading/timing arranging circuit 78 at the same state. For instance, by selecting four delayed waves (in the case where the number of tap is four) from two states of delayed wave interval and antenna, and sector space, then composing correlation outputs from despreading/timing arranging circuit 78, these diversities are achieved. Because of it, high performance communication is achieved without having the large number of despreading/timing arranging circuit 78 and RAKE composing circuit 79.

And, since a soft handover is controlled within a base station, as well as the first embodiment and the second embodiment, the communication efficiency between the base station and the switching equipment can be improved.

(Fourth embodiment)

Figure 4:
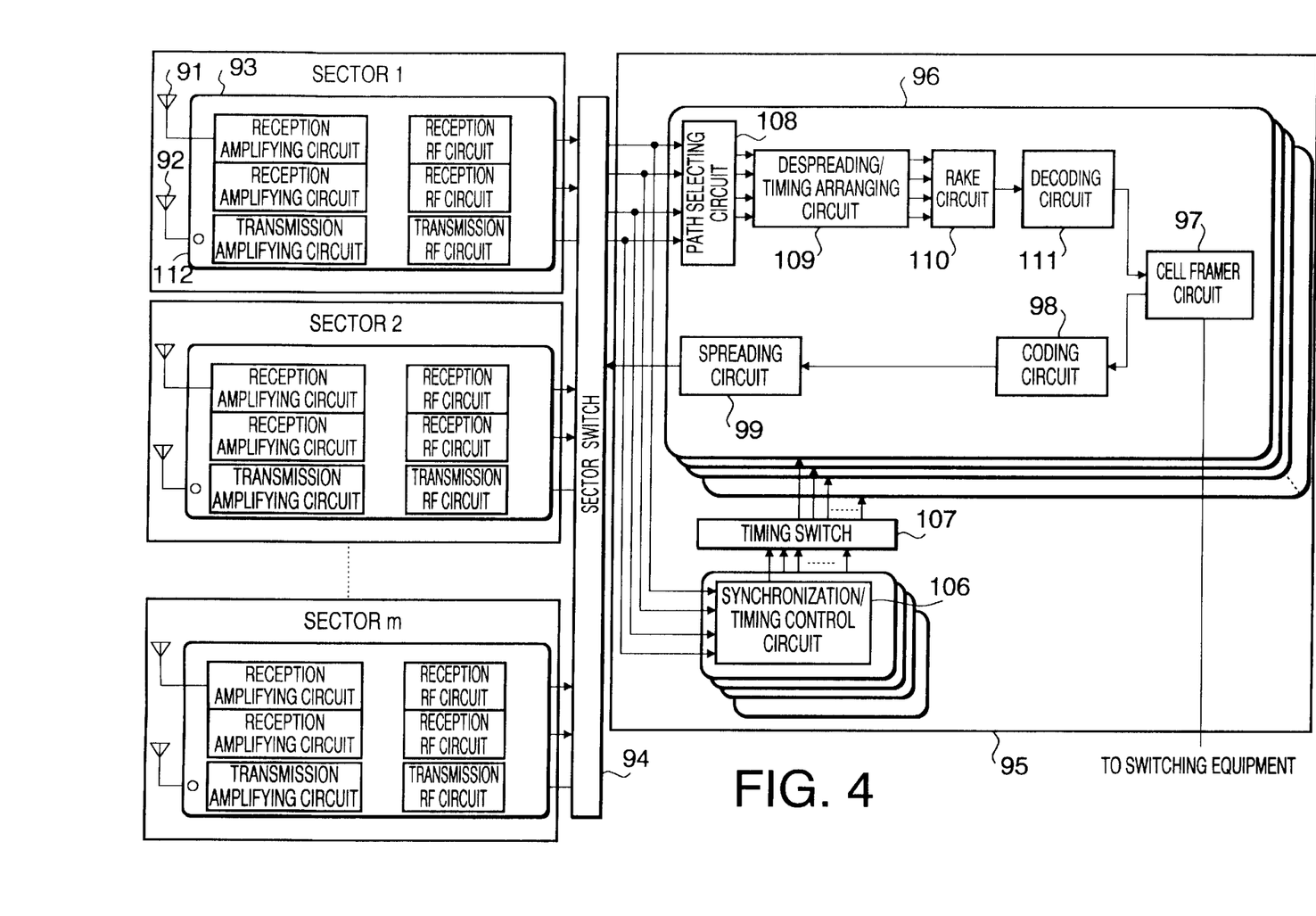
FIG. 4 is a block diagram illustrating a base station apparatus in the fourth embodiment of the present invention.

A base station of the fourth embodiment allows to batch control the timings of operations of each BB section.

FIG. 4 illustrates a block diagram of abase station apparatus of the fourth embodiment. This base station apparatus has the constitution where synchronization/timing control circuit 106, which is used to be at BB section, is prepared independently and the timing control at BB section 96 is executed by timing switch 107. Other constitutions are the same as those of the third embodiment.

This synchronization/timing control circuit 106 outputs a timing signal by detecting a synchronization from reception signals, and this timing signal is output into timing switch 107 then distributed to each BB section 96.

In transmitting ordinary data, synchronization/timing control circuit 106, in the same way as the third embodiment, outputs a path selecting signal by selecting the timings of some samples of delayed waves having high reception level. This path selecting signal is provided into corresponding BB section 96 then BB section 96 executes operations of transmission and reception, and soft handover in the same way as the third embodiment.

And, in the case of high speed data transmitting data such as moving pictures and others, the transmission using a plurality of codes (channels) is executed. In such case, one synchronization/timing control circuit 106 is connected with a plurality of BB section 96 through timing switch 107 and batch controls the operating timings of each BB section 96.

As described above, in this base station, since a synchronizing section is prepared independently, the timing control in the case of using a plurality of codes can be batch controlled, which allows smooth execution of high speed data communication using a plurality of codes concurrently.

(Fifth embodiment)

Figure 5:
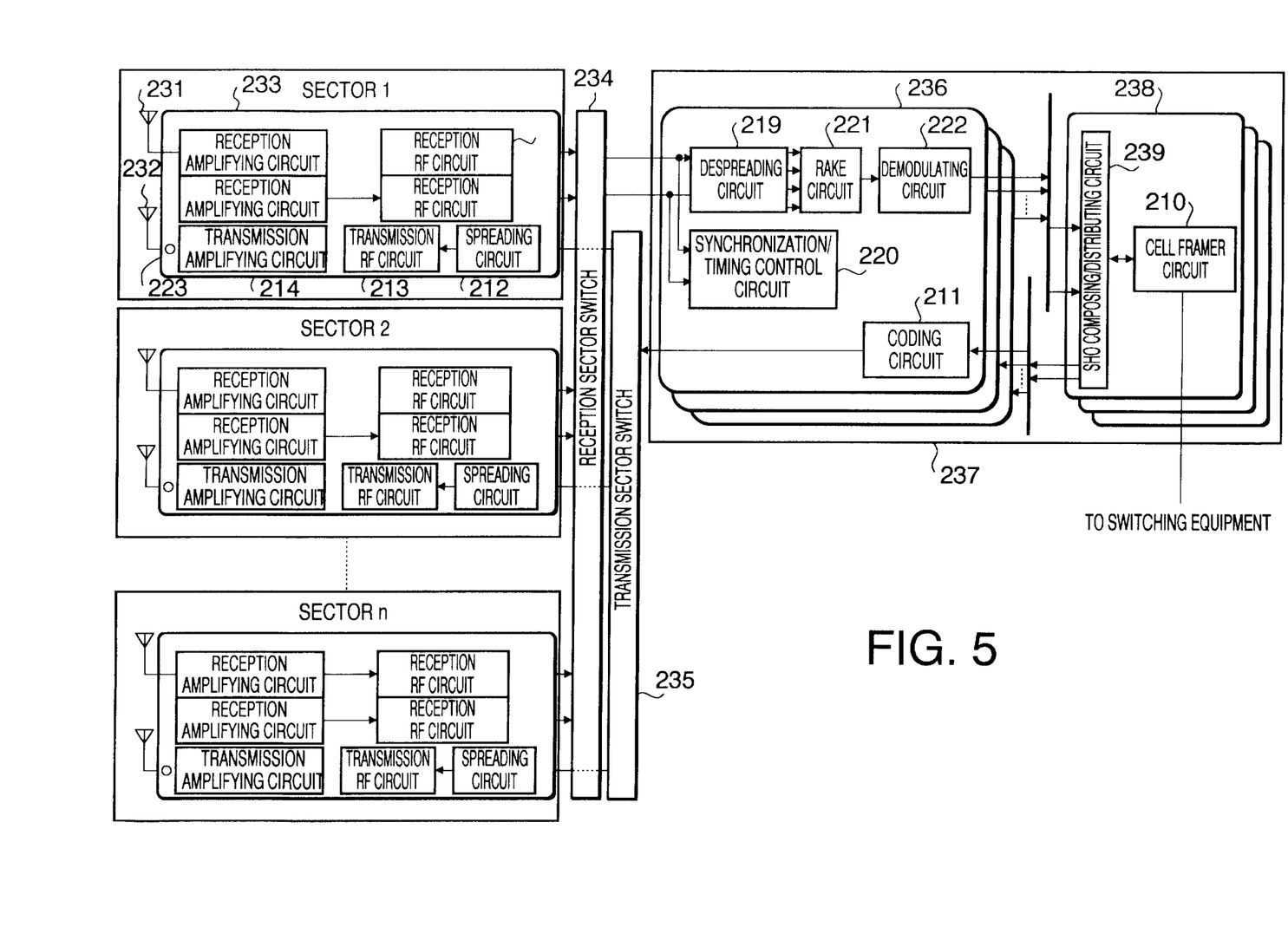
FIG. 5 is a block diagram illustrating a base station apparatus in the fifth embodiment of the present invention.

In a base station of the fifth embodiment, a spreading section to spreading process coded transmission signals is prepared at a base station transmitting/receiving unit, a sector switch is divided into a transmission sector switch and a reception sector switch, and signals passed through a transmission sector switch becomes a baseband frequency.

FIG. 5 illustrates a block diagram of a base station apparatus of the fifth embodiment. In this base station, a spreading circuit, which is provided in BB section 236 of the base station of the first embodiment, is prepared at base station transmitting/receiving unit 233, and transmission signals, which are coded then framed at coding circuit 211 at BB section 236, are input into spreading circuit 212 at base station transmitting/receiving unit 233 through transmission sector switch 235. Reception signals are input into despreading circuit 219 at BB section 236 from base station transmitting/receiving unit 233 through reception sector switch 234.

Spreading circuit 212 is a processing section to spread transmission signals into a wide frequency band by modulating coded transmission data with a spreading code. As a spreading code, there are a short code assigned for all users to identify each user and a long code assigned for all sectors to identify each sector. A short code is a code having a short period such as 64 and a long code is a code having a very long period such as about ten thousands.

It is assumed that output signals from coding circuit 211 is a 64 kbps baseband signal of spreading ratio 64. First, the baseband signal of each user is converted into a signal of 4.096 Mcps (Mega chips per second) that is 64 times bigger than the original speed by multiplying a short code of spreading ratio 64 by each bit period of the baseband signal. The signal of each user is added then the resultant signals are multiplied by a long code assigned for a sector to generate transmission data of the sector. Since the multiplying of a long code is executed with the same chip rate as the short code, the chip rate of the output signals is still 4.096 Mcps after multiplying a long code.

When spreading processing is executed at base station transmitting/receiving unit 233 not at BB section 236, spreading processing per sector not per user is executed. Spreading circuit 212 of each sector comprises short code multiplying circuits of the number corresponding to the number of short codes that are available in one sector, an adding circuit and a long code multiplying circuit. Each transmission frames input from BB section 236 though transmission sector switch 235 is input into a corresponding short code multiplying circuit to multiple. By adding these multiplied results then multiplying a long code at a long code multiplying circuit, spreading processing per sector is executed.

According to described above, the number of long code multiplying circuits, which used to require the number of circuits of BB section 236, is reduced into the number of sectors. And, since the number of short code multiplying circuits is the same, it is possible to decrease the number of circuits and reduce the speed of signals passing through transmission sector switch.

In transmission signals from a mobile station, since despreading processing per user is executed in the same way as the first embodiment, the rate of signals passing through reception sector switch 234 is the same as the chip rate before despreading. Accordingly, into transmission sector switch 235 for low rate and reception sector switch for high rate 234 are prepared separately as a sector switch. Other constitutions are the same as those of the first embodiment.

This base station apparatus 233 operates in an ordinary time (when a soft handover is not executed) as follows.

Transmission data for a certain mobile station is transmitted in ATM cells from a switching equipment and provided into cell framer circuit 210 at base station modulating/demodulating unit 237, where ATM cells are deframed to extract information signals. The information signals are passed though SHO distributing/composing circuit 239, coded at coding circuit 211 at BB circuit 236, framed then output into transmission sector switch 235.

Transmission sector switch 235 selects a sector to transmit by a control signal of a base station control section (not illustrated) then outputs transmission signals into spreading circuit 212 at base station transmitting/receiving unit 233 of the selected sector. Spreading circuit 212 executes spreading processing by multiplying transmission frames transmitted from a plurality of BB section 236 through transmission sector switch 235 by a short code, adding the results and multiplying it with a long code. Transmission signal frames spreading processed are output into transmission RF circuit 213, processed D/A conversion, orthogonal modulation and frequency conversion at transmission RF circuit 213, amplified at transmission amplifying circuit 214 then transmitted for radio propagation paths from antenna 2.

On the other hand, multiplied signals transmitted via. radio multi propagation paths from a plurality of base stations are received by antenna 231 and 232, and amplified at reception amplifying circuit 215 and 216 respectively for antenna 231 and 232. Reception RF circuit 217 and 218 execute frequency conversion, AGC processing, demodulation processing and A/D conversion of reception signals received by antenna 231 and 232 respectively to output into sector switch 234.

Reception sector switch 234 selects BB section 236 (the number n of BB section) same as when transmitted by a control signal of base station control section to output reception signals. Following processing of reception signals is executed in the same way as the first embodiment.

Next, operations in a soft handover are explained.

A base station control section decides the number m of sector to hand over on the basis of information concerning peripheral sectors and cells transmitted from a mobile station (reception power, interference power, error rate, etc.) and decides BB section 236 (the number j of BB section 236) to connect the sector, taking into account the traffic.

Reception sector switch 234 provides output signals of reception RF circuit 217 and 218 of the sector in an initial communication (referred as the first sector) to the number n of BB section 236 in the initial communication, and provides output signals of reception RF circuit 217 and 218 of the number m of sector decided to hand over into the number j of BB section 236 which executes a soft handover. Following processing of reception signals is executed in the same way as the first embodiment.

On the other hand, transmission data for a mobile station is transmitted in ATM cells from a switching equipment and cell framer circuit 210 deframes the cells to extract information signals. SHO distributing/composing circuit 210 distributes the information signals to the number n and j of BB section 236 to output.

Coding circuit 211 of each BB circuit 236 codes the information signals and frames to output into transmission sector switch 235. Transmission sector switch 235 distributes transmission frames to the first sector and the number m of sector.

Spreading circuit 212 of base station transmitting/receiving unit 233 at each sector spreading processes transmission frames to output into transmission RF circuit 213. Transmission RF circuit 213 processes orthogonal modulation and frequency conversion of spread signals. The converted signals are amplified at transmission amplifying circuit 214 then transmitted for radio propagation paths from antenna 232.

The case, where spreading circuit 212 is prepared at base station transmitting/receiving unit 233 and, as a sector switch, transmission sector switch 235 and reception sector switch 234 are prepared, is explained in the base station apparatus of the transformed first embodiment. However, it is obvious that the similar transformation can be applied for base stations of the second embodiment through fourth embodiment. It is also obvious that, in operations of those base stations, operations in the case of transmission and a handover are the same as those of the fifth embodiment, and reception operations are the same as those of the second embodiment though the fourth embodiment.

Accordingly, in the case of preparing spreading circuit 212 at base station transmitting/receiving unit 233 and preparing reception sector switch 235 and reception sector switch as a sector switch in base station apparatus of the second embodiment through the fourth embodiment, a low rate switch is available for a transmission sector switch, which allows to decrease the circuit scale of spreading circuit.

Industrial Applicability

As described above, the base station apparatus in a mobile communication in the present invention is useful in a soft handover between sectors in a base station apparatus for sector transmitting and receiving in a cellular system. And it is appropriate for reducing the hardware scale of a base station apparatus and improving the communication quality.

What is claimed is:

1. A base station apparatus in a mobile communication system in which a service area is divided into a plurality of cells each composed of a plurality of sectors, said base station apparatus comprises:

a plurality of transmitting/receiving sections each for converting a radio signal received at each sector into a reception baseband signal, while converting a transmission baseband signal of each sector into a transmission radio signal;

a plurality of baseband processing sections each for demodulating a reception signal from said reception baseband signal, while converting a transmission signal into said transmission baseband signal;

sector switch means for switching a connection between said transmitting/receiving sections and said baseband processing sections;

selecting means for selecting a new sector for a handover on the basis of information concerning peripheral sectors transmitted from a mobile station; and connection control means for controlling said sector switch means to connect the transmitting/receiving section of said new sector for a handover with said baseband processing section appropriate for said transmitting/receiving section.

2. The base station apparatus in the mobile communication system according to claim 1, wherein said connection control means, while maintaining a connection between said transmitting/receiving section of an old sector for a handover and said baseband processing section when a soft handover between sectors is executed, controls to connect the transmitting/receiving section of said new sector for a handover with said baseband processing section.

3. The base station apparatus in the mobile communication system according to claim 1 further comprise:

means for composing, when a soft handover between sectors is executed, each reception signal demodulated at each of said baseband processing sections connected with respective transmitting/receiving sections of the old sector and the new sector; and means for distributing the transmission signal for said each baseband processing section connected with respective transmitting/receiving sections of the old sector and the new sector.

4. The base station apparatus in the mobile communication system according to claim 1, wherein said connection control means controls said sector switch to connect the transmitting/receiving sections of the old sector and new sector with the same baseband processing section at a reception time while a soft handover between sectors is executed, and said baseband processing section diversity composes reception baseband signals output from said transmitting/receiving sections.

5. The base station apparatus in the mobile communication system according to claim 4, wherein said baseband processing section demodulates a reception signal by composing signals obtained by site diversity between sectors, space diversity to select an antenna and path diversity to select a delayed wave.

6. The base station apparatus in the mobile communication system according to claim 5, wherein said baseband processing section converts signals obtained by site diversity between sectors, space diversity to select an antenna and path diversity to select a delayed wave into a signal capable of being batch processed to process by composing.

7. The base station apparatus in the mobile communication system according to claim 1, wherein said base station apparatus comprises synchronizing means for acquiring a synchronization of said each baseband processing sections from said reception baseband signal provided into said each baseband processing section, and batch controls a processing timing at said each baseband processing section.

8. The base station apparatus in the mobile communication system according to claim 1, wherein said transmitting/receiving section comprises spreading means for spreading a transmission signal using a spreading code.

9. The base station apparatus in the mobile communication system according to claim 8, wherein said transmitting/receiving section comprises a transmitting circuit having said spreading means for converting said transmission baseband signal into said transmission radio signal and a receiving circuit to convert said received radio signal into said reception baseband signal, and said sector switch means comprises a transmission sector switch to input said transmission baseband signal output from said baseband processing section into said transmitting circuit of a sector corresponding to an instruction by said connection control means, and a reception sector switch to input said reception baseband signal output from a receiving circuit of said sector into said baseband processing section corresponding to an instruction by said connection control means.

10. The base station apparatus in the mobile communication system according to claim 1, wherein said selecting means is characterized in that the information concerning peripheral sectors includes at least either one of reception power of a peripheral sector, interference power and error rate.

11. The base station apparatus in the mobile communication system according to claim 1, wherein said connection control means is characterized to select the baseband processing section appropriate to connect the new sector for a handover, taking into account traffic of a sector.

12. A soft handover method between sectors in a base station apparatus in a mobile communication system, wherein said base station apparatus comprises a transmitting/receiving section for each sector, a baseband processing section for each sector and a sector switch to select a connection with said transmitting/receiving section and said baseband processing section, said soft handover method between sectors, wherein a soft handover between sectors is executed by selecting a plurality of sectors on the basis of information concerning peripheral sectors obtained from a mobile station, connecting transmitting/receiving sections of a plurality of sectors selected and corresponding baseband processing section with the sector switch to ensure a plurality of channels with said mobile station.

* * * * *

UNITED STATES PATENT AND TRADEMARK OFFICE
CERTIFICATE OF CORRECTION

PATENT NO. : 6,119,004
DATED : September 12, 2000
INVENTOR(S) : D. YAMADA et al.

It is certified that error appears in the above-identified patent and that said Letters Patent is hereby corrected as shown below:

On the cover of the printed patent, at Item [56], References Cited, Foreign Patent Documents, line 2, "2133833" should be ---62-133833---.

On the cover of the printed patent, at Item [56], References Cited, Foreign Patent Documents, line 14, "1/07043" should be ---91/07043---.

Signed and Sealed this

Fifteenth Day of May, 2001

Attest:

NICHOLAS P. GODICI

Attesting Officer

Acting Director of the United States Patent and Trademark Office